Aug. 27, 1957     O. HEGGEN     2,804,515
ELECTRIC SWITCHING DEVICE

Filed Sept. 13, 1955     2 Sheets-Sheet 1

Inventor:
Ola Heggen
By Brown, Jackson, Boettcher & Dienner
Attys.

Aug. 27, 1957 O. HEGGEN 2,804,515
ELECTRIC SWITCHING DEVICE
Filed Sept. 13, 1955 2 Sheets-Sheet 2

Inventor:
Ola Heggen
By
Brown, Jackson, Boettcher & Dienner
Attys.

United States Patent Office 2,804,515
Patented Aug. 27, 1957

2,804,515

ELECTRIC SWITCHING DEVICE

Ola Heggen, Oslo, Norway

Application September 13, 1955, Serial No. 534,104

9 Claims. (Cl. 200—61.46)

The invention relates to an electric switching device for the control of movements. Such control may serve in response to changes in the state of motion of a machine or in the movement of a material subjected to treatment, to give a warning or initiate convenient regulating or switching operations such as the start of a servo-motor, stop of the machinery or the like. The switching devices commonly used for this purpose are adapted to be closed or opened by the action of centrifugal force. However, a switching device of this kind has the drawback that it must operate at relatively high velocity and can therefore not be used to control processes where low velocities are involved. Further, a switching device with centrifugal contacts, for example in the form of a rotating mercury switch, is not capable of reliable operation if subjected to exterior inertia forces, for example by being mounted eccentrically on a rotating part of a machine. Also, centrifugal contacts may cause uncertain electrical contact.

An object of the present invention is to provide a switching device which is particularly suited for the said purpose and which is simple and efficient and is reliable in operation even at the lowest velocities without being disturbed by inertia forces which might occur, such as vibration or centrifugal forces. Consequently, the switching device as a whole may also when required be mounted eccentrically on a rotating part of a machine without the risk of failure in operation.

The principal characteristic feature of the invention is that the switching device comprises a pair of contact members which are adapted to be connected in series in a control circuit, and which are urged by a constantly acting force suitable for providing contact pressure, and against the action of a damping fluid, in the direction towards a movable contact bridge, which is adapted to be driven by a member the condition of which is to be controlled, and thereby to move periodically into contact alternately with one or the other contact member and push the same back while overcoming the said constantly acting force and again to move out of contact with the contact member concerned, the latter being withheld by the retarding action of the fluid, so that electrical contact of the contact bridge with the contact member concerned is not reestablished till after the succeeding electrical contact of the contact bridge with the other contact member has been broken anew, whereas in a condition of rest of the contact bridge the two contact members will form permanent electrical contact with the same and thereby keep the control circuit closed.

Further features of the invention will appear from the following specification, reference being had to the accompanying drawings.

Figure 1:
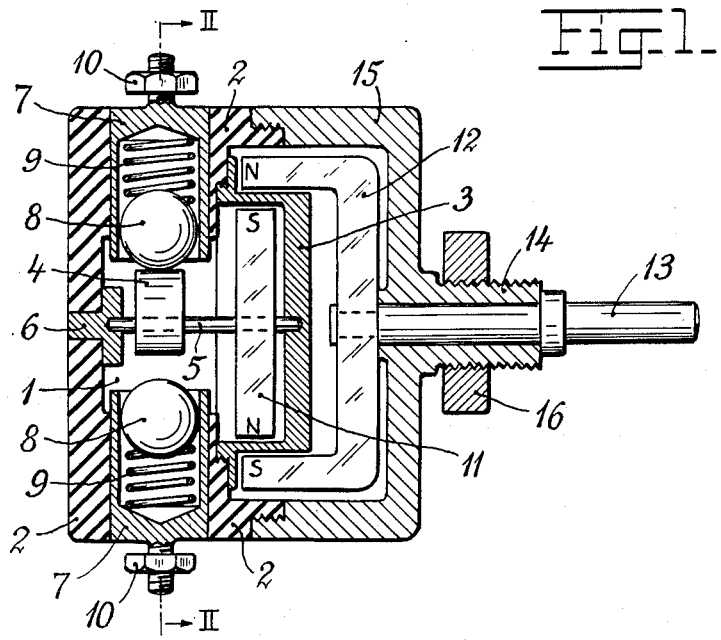
Fig. 1 shows an embodiment of the switching device in axial section along the line I—I in Fig. 2.
Figure 2:
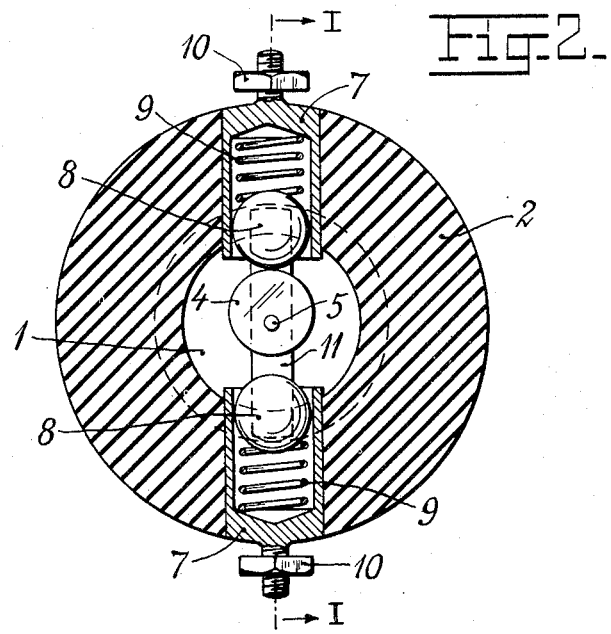
Fig. 2 shows the same in cross-section along the line II—II in Fig. 1.

In the embodiment according to Figures 1 and 2 a cylindrical housing 2 of electrically insulating material forms together with a screw-threaded cover 3 a closed chamber 1. Rotatable in the same is an electrically conducting contact bridge 4 which is fixed on a shaft 5 and is in the form of a disc-shaped cam having a suitably curved circumferential surface. In the cases shown the cam has the form of an eccentric cylinder. The cover 3 is cup-shaped and consists of non-magnetic material such as an insulating material or brass.

The shaft 5 is journalled in a bearing piece 6 inserted in the end wall of the housing 2, and in the cover 3 or a bearing piece inserted therein, in such a manner that it does not project out of the chamber 1. The chamber, which is filled with a damping fluid, suitably oil or another liquid, can thereby be made entirely tight, so that no leakage occurs. The shaft 5 is coupled to the actual driving shaft 13 by means of a magnetic transmission 11, 12. This driving shaft is journalled in a bearing sleeve 14 on a casing 15 which may for example be a die casting and which is screwed onto the housing 2 outside the cover 3. The magnetic transmission comprises a U-shaped permanent magnet 12 placed in the intermediate space between the casing 15 and the cover 3 and fixed to the end portion of the shaft 13, which projects into the said space. As it will be seen, the free pole branches of the magnet extend outside the skirt portion of the cup-shaped cover 3 and can rotate about the same. Within the cover a permanent rod-shaped magnet 11 is provided, which is fixed to the shaft 5. During the rotation of the shaft 13 the magnet rod 11 will be entrained by the magnet 13, thereby imparting rotatory motion to the shaft 5 and the contact bridge 4 with the same velocity as that of the shaft 13.

Tightly inserted in bores in the outer wall of the housing 2 are two diametrically opposite metal sleeves 7 which project a little into the chamber 1 at their inner open ends and are closed at their outer ends. Displaceably arranged in each sleeve is a contact member, which may have the form of a metal ball 8 and is spring-loaded by a compression spring 9 placed in the sleeve. This spring tends to press the ball radially inwards into electrical contact with the contact bridge 4. In the Fgures 1 and 2 the upper ball adopts such contacting position, while for reasons to be explained below the lower ball does not contact the contact bridge when the latter is in the position shown.

The balls 8 have a slightly smaller diameter than the hollow spaces in the sleeves 7, so that a certain clearance exists between the balls and the sleeve walls. When the balls are displaced in the sleeves, part of the fluid enclosed in the chamber 1 and the sleeves will be forced to flow through the clearance because of the suction and displacement effect caused by the movement of the balls. Hereby a braking action occurs, the magnitude of which is dependent on the size of the clearance and the nature of the fluid. When a ball does not engage the cam member 4 and the appurtenant spring pushes it radially inwards, its motion will therefore be delayed, which is of decisive importance for the operation of the switching device.

The contact balls 8 may be connected in an electric control circuit by means of exterior connection terminals, for example by making the sleeves 7 pass through the chamber 1 to the outside and providing them with terminal screws carrying nuts 10, whereby the balls 8, which are to be conductively interconnected by the contact bridge 4 when the rotation ceases, are connected in series in the circuit.

The switching device operates in the following manner:

When the contact bridge 4 rotates it will alternately engage and form electrical contact with one and the other contact ball 8 for each half revolution and thereby give the ball an outward mechanic impulse, so that the balls are alternately pushed outwardly in the sleeves against the action of the springs and the braking force. When a ball has received an impulse it will be pushed inwards towards the contact bridge by the appurtenant spring, but this displacement being delayed by the braking action, the ball cannot maintain the contact with the contact face of the contact bridge and does not engage the same again till the bridge has turned more than half of a revolution and imparts the next outward impulse to the ball. The other ball will behave similarly with a phase displacement of 180°.

In Figures 1 and 2 a position of the contact bridge 4 is shown in which the upper ball 8 is pushed entirely into the sleeve and engages the contact bridge, whereas the lower ball on having received an impulse is in delayed motion inwards towards the contact bridge without yet having come into contact with the same. Consequently, the balls 8 will never be able to engage the contact bridge at the same time so long as the latter rotates with a number of revolutions above a certain minimum, which may be very low, and hence the control circuit will be permanently broken during the rotation. If, however, the rotation ceases for some reason or other, both balls will after a certain time, dependent on the magnitude of the braking action, engage the contact bridge, whereby the control circuit is closed.

As mentioned above, oil may conveniently be used as the damping fluid in the chamber 1 and the sleeves 7. Hereby it is obtained that the movable parts are constantly lubricated and that oxidation of the contacts is prevented. Besides, the size of the clearance between the contact balls and the sleeve wall and the retarding action caused by the fluid will be less critical than if the chamber had been filled with air. Apart from the said clearance the viscosity of the oil is of importance for the magnitude of the retarding effect. When using thick oil a strong retarding effect is obtained and the switching device will then be capable of safely maintaining an interruption at very low velocities of the contact bridge 4, which is often of importance. On the other hand, this will prolong the time required by the balls for forming electrical contact after the rotation has ceased.

When using thin oil a higher velocity is required for ensuring interruption, whereas the time required for forming electrical contact is reduced. If desired, the retarding effect may also be varied by adjusting the force of the spring 9.

Due to the fact that the two contact balls are connected in series and that during the rotation they can never form electrical contact at the same time, a permanent interruption without tottering is always obtained without this interruption being impaired by inertia forces at any velocity. It is therefore possible, when required, to mount the switching device on a rotating part of a machine without its operation becoming uncertain. A minimum of inspection is required and since the contacts are hermetically enclosed, the device may be installed in places where there exists a danger of explosion or there occurs an aggressive atmosphere, an accumulation of dust or the like, which might damage the contacts. At the same time the switching device only needs small forces to become operative, and it has an exceptionally high security of operation.

As it will be understood, when using a symmetric shape of the cam member as shown, the switching device operates equally well for both directions of rotation. It may also operate if the contact bridge performs an oscillating rotative movement with a rotational angle of approximately 180°.

Although the switching device according to the invention has been described in a convenient embodiment the design thereof may be modified in various manners. Thus, instead of balls, contact members for example in the form of plungers may be used which may be actuated by springs or compressed air, and instead of making the spaces on both sides of the contact members communicate only through the clearance thereof, separate narrow passages may be provided for this purpose, as it is well known for liquid dampers in general. Further, with a suitable form and arrangement of the contact bridge the same may engage the contact members with different portions of its surface, and if for example a star-like shape is chosen for the contact bridge, the same may engage each contact member several times in the course of one revolution. If desired, it may also co-operate with more than two contact members, and likewise two or more contact bridges with or without a common shaft may be accommodated within a common enclosure together with the appurtenant contact members. Further, it is not essential that the contact bridge acts on the contact members in a radial direction since for example also an axial movement of the latter is possible, nor is it essential that the movement of the contact bridge is rotational, since for example also a linear reciprocating motion may be contemplated. Finally, also the magnetic transmission may be dispensed with when this is permissible from the viewpoint of tight enclosure and especially for example in the case of a vertical position of the shaft.

Many applications are possible for the contact device described. For example it may be used for indicating failures of important machine parts which must move in order that other machine parts or the like shall operate correctly. Further, the device may be used for causing automatic alarm, for example when a conveyor belt stops or an automatic feeding of eccentric presses or the like ceases. A very important application is the instantaneous stopping of the machinery in cable factories or textile factories in the case of a rupture of a strand or thread so that the rupture may be repaired before further damage occurs. In all these cases the driving shaft 13 of the switching device is connected to such a part of the machine or such a material treated by the machine, for example the strands of cable twisting machines, which comes to a stop in the case of a failure.

Figure 3:
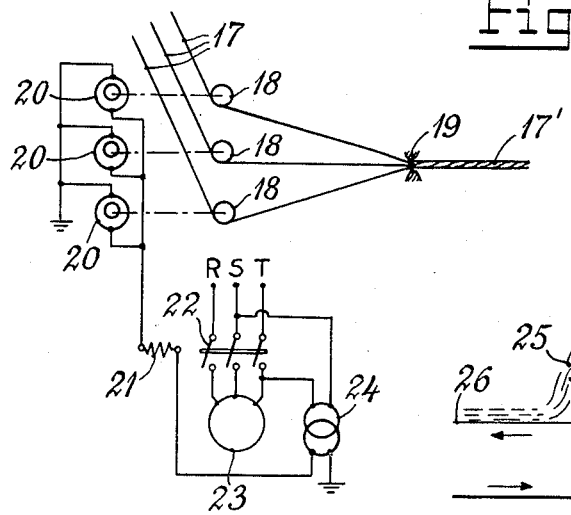
Figures 3 to 7 are elementary diagrams illustrating examples of application.

Fig. 3 illustrates diagrammatically an example of an arrangement where a twisting machine for cables automatically comes to a stop when a rupture of a strand occurs. The individual strands 17, the number of which may be very high, are fed from a corresponding number of bobbins and passed to a twisting point 19 where the strands are twisted together into a cable 17'. On its path from the bobbin to the twisting point each strand is passed over a grooved roller or the like 18, fixed on the driving shaft 13 of a switching device according to the invention. As it will be seen, one switching device is provided for each strand. When the twisting machine operates correctly, the contact bridge of each switching device is driven by the corresponding strand 17, so that continuous interruption is maintained in the contact devices. When, however, a rupture occurs in one or more of the strands, the driving force will disappear, so that the corresponding switching device or devices will stop and thereby close its contact. The switching devices 20 are connected in parallel in an electric control circuit which includes a disconnecting magnet 21 for the main switch 22 of the driving motor 23 of the machinery and receives voltage over an auxiliary transformer 24 from two phases of the supply conductor of the motor in front of and behind the switch 22 respectively. So long as the machinery is running normally the switching devices 20 will maintain a continuous interruption in the control circuit, but if due to the rupture of a strand 17 a switching device comes to a stop it will close the control circuit so that the switch 22 is opened and causes stopping of the motor 23, whereby at the same time also the supply of current to the control circuit is interrupted.

Figure 4:
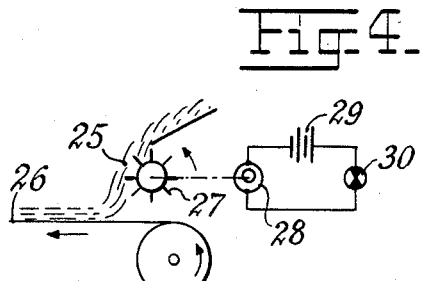

In Fig. 4 it is illustrated how the switching device may be used for controlling the feed in a manufacturing process. As an example the cement manufacture may be mentioned, where raw material or semi-product 25 in the form of a powder is supplied to a conveyor belt 26 by gravity, and where a warning is required when an interruption of the feed occurs and the alarm devices used for this purpose must operate with small forces and the closing of the contacts must not be hampered by dust from the material. In the example shown a blade-wheel 27 driven by the stream of material is connected to a switching device 28 designed according to the invention and connected in a control circuit including a voltage source 29 and for example a signal lamp 30. So long as the material is flowing downwardly onto the belt the blade-wheel 27 will rotate and the switching device 28 will thereby keep the circuit open, but as soon as a stop in the feed occurs the circuit will be closed, causing the lamp 30 to light.

Figure 5:
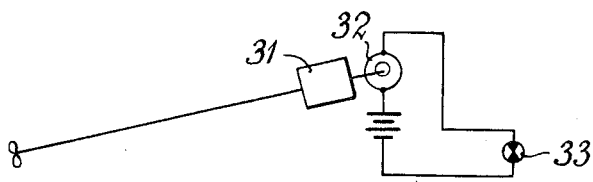

In Fig. 5 31 is a log of the kind used for recording accomplished distances at sea. As it is well known, a log of this kind may easily get stuck for a shorter or longer time due to seaweed, refuse etc. clinging to the propeller of the log, which, if it is not discovered, may entail false navigation or, even if discovered, will necessitate new bearing or even an arbitrary estimation of the distance.

In Fig. 5 the log 31 is shown to be connected to a switching device 32 according to the invention, which device keeps a control circuit open so long as the log is running, but gives a warning by a lamp 33 as soon as the log comes to a stand-still. In this connection it is again of great value that the switching device operates safely with small forces and speeds and may be hermetically sealed so that the sea water cannot cause damage on the contacts.

Figure 6:
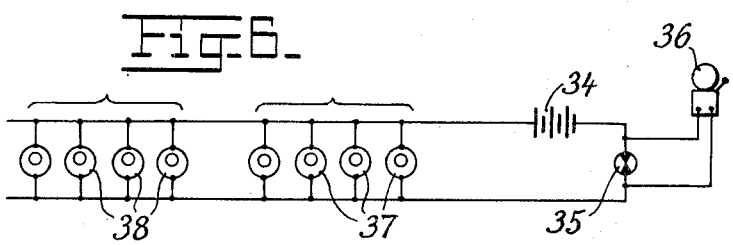

Fig. 6 is an elementary diagram for a control circuit which includes switching devices according to the invention and can be used for determining whether the wheels of a railway train are rotating during braking or not. If one or more wheels stand still and slide on the rails, this causes an abnormal local wear which may necessitate repair or replacement. The circuit is fed for example by a voltage source 34 on the locomotive, on which it may also include a signal lamp 35 and/or an alarm bell 36, and comprises a series of switching devices according to the invention connected in parallel, viz. switching devices 37 on the first car, 38 on the next etc., one device on each wheel. So long as all the wheels rotate the circuit will constantly be open, but as soon as one or more wheels come to a stop during braking the engine driver will get a warning so that by lifting the brakes he may again cause the wheels to grip.

Though the preceding examples for the use of the switching device all relate to cases in which the stopping of a motion is intended to cause a warning or desired operations, the invention may just as well be used for determining when a normally stationary member starts moving. For example the switching device may be applied for burglary control, for instance in cars, by using switching devices causing opening of a circuit when the steering wheel moves, the fan starts running, the wheels start moving and/or the car yields to a weight etc., whereby for example a signal may be produced or the ignition of the motor may be disconnected.

Figure 7:
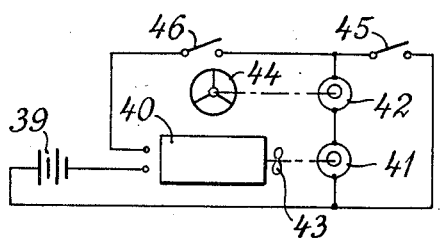

Fig. 7 illustrates an example for the last mentioned case. In series with the battery 39 supplying current for the ignition of the motor 40 there are inserted series-connected switching devices 41, 42 designed in accordance with the invention and mechanically connected to the fan 43 and the steering wheel 44 respectively. The switching devices are shunted by a switch 45, which may be located in some convenient hidden place, and when this switch is open and the ignition switch 46 on the dash-board is closed a turning of the steering wheel 44, start of the motor 40 with the fan 43 etc. will cause an interruption in the ignition circuit so that the motor will stop.

These scattered examples taken from very different fields are, of course, far from exhaustive but may be suited for giving an idea of the extensive possibilities of using the invention.

I claim:

1. An electric switching device of the character described comprising a casing, a member arranged for movement in said casing, a contact bridge fixed to said movable member in said casing, a pair of contacts in said casing adapted for series connection in a control circuit, means supporting said contacts for movement into and out of engagement with said bridge contact, means carried by said last named means and normally urging said pair of contacts into simultaneous engagement with said bridge contact whereby to permanently maintain the circuit closed through said pair of contacts whenever said movable member is at rest, and means for actuating said movable member for causing the bridge contact to alternately and directly engage said pair of contacts and alternately move them away and out of simultaneous engagement with said bridge contact whereby to permanently maintain the circuit open through said pair of contacts whenever said movable member is being continuously actuated.

2. The device of claim 1, wherein the pair of contacts are ball shaped.

3. The device of claim 1, wherein the means supporting the pair of contacts in said casing comprises a pair of metal sleeves.

4. The device of claim 1, wherein the means normally urging the pair of contacts into simultaneous engagement with the bridge contact comprises a pair of springs.

5. The device of claim 1, wherein the casing is formed of insulating material and the pair of contact members are provided with external terminals.

6. The device of claim 1, wherein the contact bridge comprises an eccentrically shaped member.

7. The device of claim 1, wherein the means for rotating said shaft comprises a magnetic transmission.

8. The device of claim 7, wherein the casing contains a damping fluid for effecting a damping action on the movement of said contact members.

9. The device of claim 8, wherein the contact members are supported in metal sleeves, said sleeves having a clearance with respect to said contact members such that there will be a creeping of the damping fluid therein sufficiently slow to effect a retarding action on the movement of said contact members.

References Cited in the file of this patent

UNITED STATES PATENTS

| | | |
|---|---|---|
| 976,345 | Cooper | Nov. 22, 1910 |
| 2,286,611 | Farmer | June 16, 1942 |
| 2,757,251 | Ingres | July 31, 1956 |